(12) United States Patent
Banerjea et al.

(10) Patent No.: US 6,873,650 B1
(45) Date of Patent: Mar. 29, 2005

(54) TRANSMISSION RATE COMPENSATION FOR A DIGITAL MULTI-TONE TRANSCEIVER

(75) Inventors: Raja Banerjea, Edison, NJ (US); Bahman Barazesh, Marlboro, NJ (US); Tony S. El-Kik, Allentown, PA (US); Kannan Rajamani, Edison, NJ (US)

(73) Assignee: Agere Systems Inc., Allentown, PA (US)

( * ) Notice: Subject to any disclaimer, the term of this patent is extended or adjusted under 35 U.S.C. 154(b) by 571 days.

(21) Appl. No.: 09/607,619

(22) Filed: Jun. 30, 2000

(51) Int. Cl.[7] .............................. H04B 1/38; H04J 3/16
(52) U.S. Cl. .................... 375/219; 375/296; 370/465; 370/538
(58) Field of Search ............................. 375/219, 220, 375/262, 296, 320, 260, 222, 377; 370/465, 538, 535, 537, 541, 543, 498, 503; 341/61

(56) References Cited

U.S. PATENT DOCUMENTS

| | | | | |
|---|---|---|---|---|
| 5,666,383 A | * | 9/1997 | Huang et al. | 375/260 |
| 5,909,463 A | * | 6/1999 | Johnson et al. | 375/220 |
| 6,252,920 B1 | * | 6/2001 | Hsu et al. | 375/377 |
| 6,285,720 B1 | * | 9/2001 | Martone | 375/262 |
| 6,404,806 B1 | * | 6/2002 | Ginesi et al. | 375/222 |
| 6,584,160 B1 | * | 6/2003 | Amrany et al. | 375/296 |
| 6,618,367 B1 | * | 9/2003 | Riazi et al. | 370/347 |
| 6,657,950 B1 | * | 12/2003 | Jones et al. | 370/208 |

* cited by examiner

Primary Examiner—Temesghen Ghebretinsae
Assistant Examiner—Qutub Ghulamali

(57) ABSTRACT

A circuit compensating for the difference in transmission rate of digital samples generated in transmit and receive paths between a user and a transceiver processing in the frequency domain, such as a digital multi-tone (DMT) transceiver. Compensation of the DMT transmission rate in the receive path in accordance with exemplary embodiments of the present employs zero-padding of the frequency domain coefficients generated by the DMT transceiver prior to applying an inverse transform, such as the inverse fast Fourier transform (IFFT). Zero-padding the frequency domain coefficients allows for the compensation of the transmission rate in the receive path by generating digital samples from the frequency domain coefficients with an inverse transform having a rate matched to the frequency domain transform and rate employed in the transmit path.

19 Claims, 3 Drawing Sheets

TRANSMISSION RATE COMPENSATION FOR A DIGITAL MULTI-TONE TRANSCEIVER

BACKGROUND OF THE INVENTION

1. Field of the Invention

The present invention relates to a transceiver processing user signals in a telecommunication system, and, in particular, to compensation for different transmission rates of digital signals in transmit and receive paths that are generated between the transceiver and a user.

2. Description of the Related Art

Transceivers commonly process signals transferred between a user and a telecommunications network. One common form of signal processing is coordination of data transfer between a user and the communication network for a particular form of modem transmission. For such coordination, the modem must generate and receive combinations of tones that represent either training, connection supervision, or modulated/coded data as specified by the particular standard, such as V.90 or V.34. For example, a digital multi-tone (DMT) transceiver may be included in a modem to generate and receive such combinations of tones. Modem signals are transferred between the user and the DMT transceiver as analog signals converted to the digital domain by a coder/decoder (codec), such as a pulse code modulation (PCM) codec. The codec samples the analog modem signal received from the user and/or generates an analog modem signal for the user from digital samples generated from the output of the DMT transceiver. Since the tones employed are of finite duration and combinations of frequency and phase of distinct carriers, the DMT transceiver operates in the frequency domain on complex coefficients representing the signals. The Fourier transform, well known in the art, may be employed to convert between the sampled modem signals and the complex coefficients that are processed by the DMT transceiver.

FIG. 1 shows a prior art system 100 processing modem signals between a user and a telecommunications network. System 100 includes DMT transceiver 101 processing the modem signals in transmit (user to network) and receive (network to user) paths and codec 102 providing conversion between the bi-directional analog signals and the digital signals in the transmit and receive paths. Codec 102 samples analog modem signals from the user to provide a sequence of digital samples in the transmit path, and codec 102 constructs analog modem signals for the user from a sequence of digital samples in the receive path. In the receive path, system 100 includes time domain equalizer (TEQ) 106 and fast Fourier transform (FFT) processor 107. TEQ 106 equalizes the analog waveform represented by the digital samples based on the type of FFT transform subsequently applied to the sampled modem signal by FFT processor 107. Filtering may equalize the analog waveform to shorten channel length effects, such as memory or signal dispersion. FFT processor 107 applies a 256-point complex FFT to a block of 512 digital samples (representing the equalized, sampled analog signal) to generate 256 complex coefficient values (i.e., 256 real and 256 imaginary coefficients) for processing by the DMT transceiver 101.

In the transmit path, system 100 includes inverse FFT (IFFT) processor 103, copy and add module (CP ADD) 104, and upsampler 105. IFFT processor 103 buffers 32 complex coefficients representing (in the FFT transform frequency domain) the modem tone combinations generated by the DMT transceiver 101. IFFT processor 103 then applies a 32-point complex IFFT transform to the 32 complex coefficients to generate a block of 64 digital samples that represent a sampled analog modem signal. CP ADD 104 copies the first four digital samples in the sequence and appends them to the end of the sequence (after sample number 64). As is known the art, copying digital samples from the beginning of the block and appending them to the end of the block ensures that the signal represented by the digital samples generated by the IFFT processor 103 is periodic.

DMT transceiver 101 may generate digital samples in the receive path from complex-valued coefficients in the frequency domain at a so-called "DMT transmission rate" that is different from the rate of digital samples generated by codec 102 in the receive path. The DMT transmission rate in the transmit path without any rate compensation is generally less than the transmission rate in the receive path. However, codec 102 desirably employs analog-to-digital (A/D) converters (and possibly pulse code modulation (PCM) encoders) in the receive path operating at the same rate as its digital-to-analog (D/A) converters (and possibly PCM decoders) in the transmit path.

Consequently, the difference in transmission rate of the digital samples between the transmit and receive paths is compensated for in the receive path by interpolation of the digital samples provided from the CP ADD 104. Interpolation of the prior art systems such as shown in FIG. 1 is typically performed by an interpolating filter or upsampler, such as upsampler 105. Upsampler 105 interpolates by 8 the block of 68 samples from CP ADD 104 and then may select a subset of the interpolated samples (e.g., by truncation) to provide a block of 512 digital samples. Such compensation may require considerable processing by, and hence considerable circuit area and power in, an integrated circuit implementation.

SUMMARY OF THE INVENTION

The present invention relates to compensating for the difference in transmission rate of digital samples generated in transmit and receive paths between a user and a transceiver processing in the frequency domain, such as a digital multi-tone (DMT) transceiver. Compensation for the transmission rate in the receive path in accordance with exemplary embodiments of the present employs zero-padding of the frequency domain coefficients generated by the transceiver prior to applying an inverse transform, such as the inverse fast Fourier transform (IFFT). Zero-padding the frequency domain coefficients allows for the compensation of the transmission rate in the receive path by generating digital samples from the frequency domain coefficients with an inverse transform having a rate employed in the transmit path.

In accordance with an exemplary embodiment of the present invention, transmission rate compensation includes 1) a transmit path configured to receive upstream coefficients in a frequency domain at a first data rate and to generate a block of upstream digital samples at a second data rate; and 2) a receive path configured to receive a block of downstream digital samples at the second data rate and to generate downstream coefficients in the frequency domain at a third data rate. The first data rate is different from the second data rate; and the transmit path comprises a zero-padding module configured to append one or more zeros to each set of received upstream coefficients; and an inverse transform module configured to convert each set of zero-padded upstream coefficients into a corresponding block of upstream digital samples at the second data rate.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
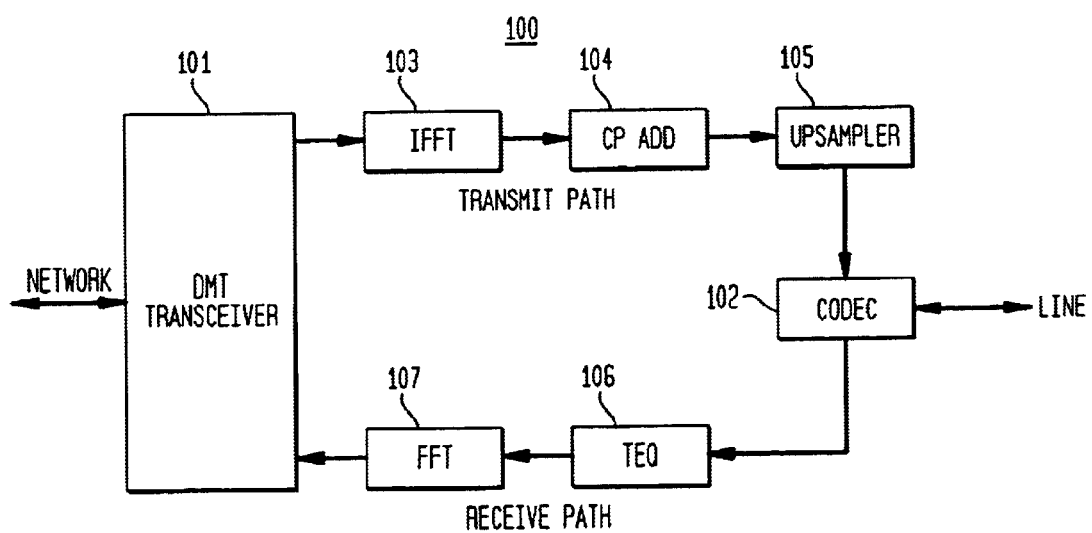
FIG. 1 shows a system of the prior art processing modem signals between a user and a telecommunications network by a digital multi-tone transceiver.
Figure 2:
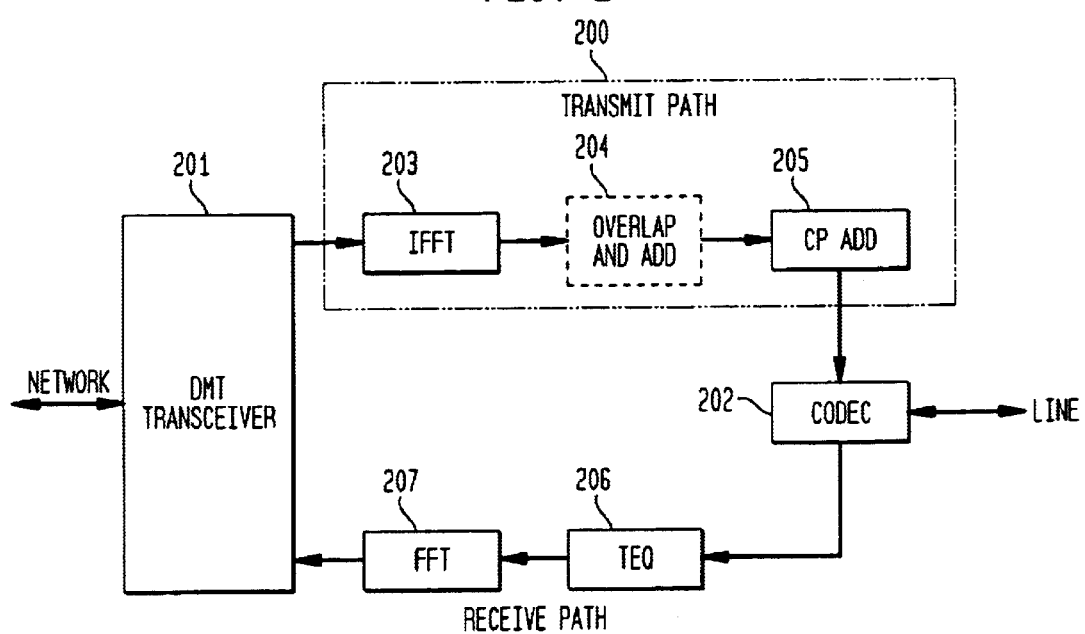
FIG. 2 shows a block diagram of a circuit employing inverse fast Fourier transform (IFFT) and zero-padding to compensate for DMT transmission rate in accordance with an exemplary embodiment of the present invention.

FIG. 2 shows a block diagram of circuit 200 employing inverse fast Fourier transform (IFFT) and zero-padding to compensate for differences in digital multi-tone (DMT) transmission rate in accordance with an exemplary embodiment of the present invention. DMT transceiver 201 is coupled to circuit 200 and processes digital modem signals represented in the frequency domain in transmit and receive paths between users and a telecommunications network. Codec 202 is also coupled to circuit 200 and converts analog modem signals received from the user into digital samples provided in a transmit path, and converts digital samples provided in the receive path from circuit 200 into analog modem signals for transmission to the user.

While the "line" as described herein is a modem user generating and receiving analog modem signals that are converted between analog and discrete signals, the present invention is not so limited and the user may be any entity generating and receiving digital samples at given transmit and receive rates. In addition, while the exemplary embodiment of FIG. 2 is described herein for use with a codec 202 converting between the analog and digital domains, the present invention is not so limited. One skilled in the art may employ the techniques described herein in any system compensating for a difference between the transmission rates of digital samples generated from coefficients in the frequency domain in one path and digital samples generated in another path.

The receive path includes a time domain equalizer 206 and fast Fourier transform (FFT) processor 207. TEQ 206 has an impulse response that filters the sampled analog signal to reduce channel effects (e.g., shorten the channel length), and the impulse response is selected for a particular implementation based on the particular FFT transform applied by FFT processor 207. For the exemplary embodiment shown in FIG. 2, FFT processor 207 applies a 256-point complex FFT to the equalized, sampled modem signal to generate 256 complex coefficients representing the modem signal in the frequency domain that are subsequently processed by DMT transceiver 201.

In the transmit path, circuit 200 includes an inverse fast Fourier transform (IFFT) processor 203, optional overlap and add circuit 204, and copy and add module (CP ADD) 205. The IFFT processor 203 first pre-processes, e.g., 32 complex values (a set of 32-point, complex FFT coefficients) representing the modem signal in the frequency domain as generated by DMT transceiver 201. Pre-processing by IFFT processor 203 includes buffering the sequence of 32 complex coefficients and appending 224 complex zeros (complex-valued zero coefficients, i.e., 0+0j) to the end of the sequence (termed herein as "zero-padding"). IFFT processor 203 then applies a 256-point, complex inverse fast Fourier transform to the 256 complex coefficients to generate a block of 512 digital sample values. Optional overlap and add circuit 204 may be employed as a filter to reduce boundary (frequency) artifacts that may occur at the block boundaries in the sequence of digital samples generated from the output of IFFT processor 203. As is known in the art, overlap and add circuit 204 may store digital samples from the previous block and average them with digital samples of the current block to smooth and filter the frequency spectrum. Such filtering reduces or eliminates spectral components in the side lobes of the IFFT transform applied by the IFFT processor 203. To ensure that the signal represented by the sequence of digital samples is periodic, CP ADD 205 copies, e.g., the first four samples provided from the optional overlap and add circuit 204 and appends the copied samples to the end of the block. Codec 202 converts the digital samples from CP ADD 205 into an analog modem signal for transmission to the user.

Figure 3:
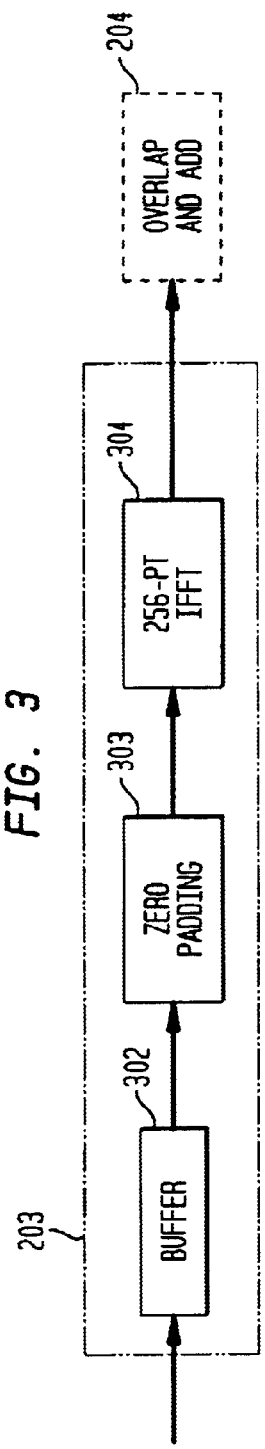
FIG. 3 shows a block diagram of an exemplary implementation of the IFFT processor shown in FIG. 2.

FIG. 3 shows a block diagram of an exemplary implementation of IFFT processor 203 shown in FIG. 2. IFFT processor 203 includes buffer 302 for storing both 32 real and 32 imaginary coefficients provided by the DMT transceiver 201 at the DMT transmission rate. The coefficients of the buffer 302 are provided to zero-padding circuit 303. Zero-padding circuit 303 appends, e.g., 224 complex zeros to the first 32 coefficients provided by the buffer 302, and then provides each complex coefficient at the transmission rate matched to the transmission rate of the transmit path of codec 202. Such matching may be to provide one complex coefficient every two clock cycles of the transmission rate of codec 202 (e.g., a real coefficient during one clock cycle and a corresponding imaginary coefficient during the next clock cycle). A 256-point, complex IFFT is applied to the 256 complex coefficients by 256-point, complex IFFT module (256-PT IFFT) 304 to generate a block of 512 digital samples at the transmission rate of codec 202 for subsequent processing by, for example, optional overlap and add circuit 204.

As would be apparent to one skilled in the art, the present invention is not necessarily limited to zero padding of 32-point complex FFT coefficients to apply a 256-point complex IFFT transform. In addition, compensation between other relative receive path to transmit path transmission rates other than 1:8 (i.e., the rate of receive path is ⅛ of the rate of transmit path without compensation) may be implemented. In addition, other processing combinations of zero-padding the IFFT transform and interpolation may be used. For example, the zero-padding circuit 303 may append 96 complex zeros to the coefficients stored in buffer 302, and a 128-point, complex IFFT transform may be applied. The output of the IFFT processor 203 may then be interpolated by 2 to provide a similar result as the IFFT processor 203 applying a 256-point complex IFFT transform as shown in FIG. 3. The interpolation by 2 may either be before the optional overlap and add circuit 204 or after the CP ADD 205 prior to conversion from a digital signal to an analog signal by codec 202.

Figure 4:
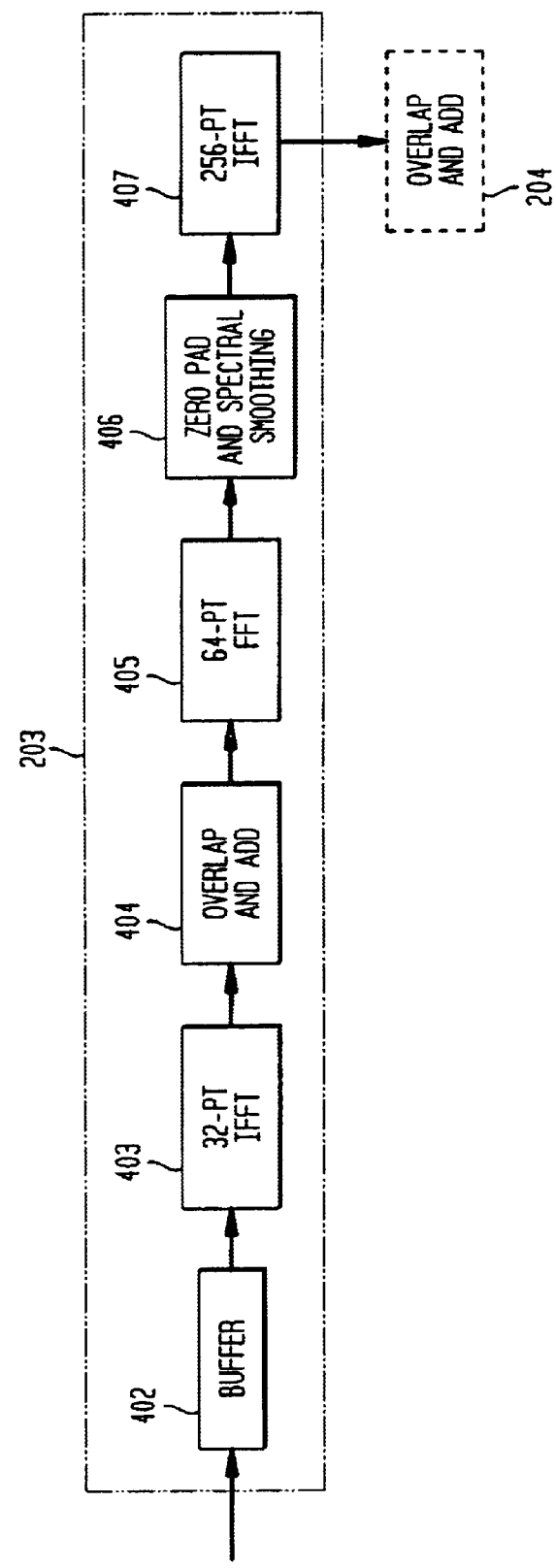
FIG. 4 shows a block diagram of an alternative exemplary implementation of the IFFT processor shown in FIG. 2.

FIG. 4 shows a block diagram of an alternative implementation of the IFFT processor 203 shown in FIG. 2. IFFT processor 203 as shown in FIG. 4 comprises buffer 402, 32-point complex IFFT module (32-PT FFT) 403, overlap and add circuit 404, 64-point complex FFT module (64-PT FFT) 405, zero-pad and spectral smoothing module 406, and 256-point complex IFFT module (256-PT IFFT) 407. The alternative implementation as shown in FIG. 4 may exhibit less distortion or other added noise in the reconstructed analog modem signal when converted from the digital domain to the analog domain by, for example, codec 202. However, as would be apparent to one skilled in the art, such alternative implementation may exhibit less distortion at the expense of increased processing, circuit, and/or computational complexity.

Referring to FIG. 4, buffer 402 stores 32 complex coefficients generated by DMT transceiver 201. A 32-point complex IFFT transform is applied by 32-PT IFFT 403 to the 32 complex coefficients stored in buffer 402 to form a block of 64 digital samples. Overlap and add circuit 404 processes the block of 64 digital samples to reduce or remove block boundary effects at the (frequency) side lobes of the 32-point, complex IFFT transform (by, e.g., band-limiting the spectrum of the signal represented by the digital samples). The block of 64 digital samples representing the modem signal is then again transformed into the frequency domain with a 64-point, complex FFT transform applied by 64-PT FFT 405. The 64-PT FFT 405 first interpolates the block of 64 digital samples by 2 to generate a block of 128 digital samples, and then applies the 64-point, complex FFT transform to the block.

Zero-pad and spectral-smoothing module 406 appends 192 complex zeros to the 64 complex coefficients generated by 64-PT FFT 405. Zero-pad and spectral-smoothing module 406 may also modify some of the 64 complex coefficients to smooth high-amplitude, high-frequency components associated with processing on a block-by-block basis (block truncation). The 256-point complex IFFT transform is applied to the zero-padded complex coefficients by 256-PT IFFT 407 to generate the sequence of digital samples with a transmission rate equivalent to the transmission rate in the receive path of codec 202. As described previously, further processing to reduce or remove block boundary artifacts, such as those associated with the side-lobe spectral components of the 256-point, complex IFFT-transform, may be provided by optional overlap and add module 204.

Compensation for DMT transmission rate by circuits, such as integrated circuits, implementing an exemplary embodiment of the present invention may provide advantages of reduced circuit complexity, area, and power consumption than similar implementations relying on an IFFT with only interpolation for rate compensation. Such advantages may follow from both FFT and IFFT implementations with zero-padding, such as the 32-, 64-, and 256-point complex transforms described herein, since they employ standard twiddle factors and exploit known techniques for reducing overall computational complexity for combinations with many zero-valued coefficients. Consequently, the transform operations of exemplary implementations of the present invention may require fewer computations, and hence less circuitry.

While the exemplary embodiments of the present invention have been described with respect to methods, systems, or processes, the present invention is not so limited. As would be apparent to one skilled in the art, various functions may be implemented in the digital domain as processing steps in a software program, by digital logic, or in combination of both software and hardware. Such software may be employed in, for example, a digital signal processor, microcontroller or general-purpose computer. Such hardware and software may be embodied within circuits implemented in an integrated circuit.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A circuit for providing transmission rate compensation, comprising:
    (a) a transmit path configured to receive downstream coefficients in a frequency domain at a first data rate and to generate a block of upstream digital samples at a second data rate; and
    (b) a receive path configured i) to receive a block of downstream digital samples in a time domain at the second data rate and ii) to generate downstream coefficients in the frequency domain at a third data rate, wherein:
    the first data rate is different from the second data rate; and
    the transmit path comprises:
        (1) a zero-padding module configured to append one or more zeros to each set of received downstream coefficients;
        (2) an inverse transform module configured to convert each set of zero-padded downstream coefficients into a corresponding block of downstream digital samples at the second data rate;
        (3) an intermediate inverse transform module applying an intermediate inverse transform to the received downstream coefficients to generate intermediate digital samples,
        (4) an interpolator interpolating the intermediate digital samples, and
        (5) an intermediate transform module applying an intermediate transform to the upstream coefficients to generate the upstream coefficients for the inverse transform module.

2. The invention as recited in claim 1, wherein the transmit and receive paths are coupled between a digital multi-tone (DMT) transceiver and a codec, and the blocks of upstream digital samples are generated for the codec and the blocks of downstream digital samples are generated by the codec.

3. The invention as recited in claim 1, wherein the inverse transform module in the transmit path further comprises an interpolator to generate the downstream digital samples at the second data rate.

4. The invention as recited in claim 1, wherein the transmit path further includes a filter reducing or eliminating signal components at frequencies generated from block boundary effects.

5. The invention as recited in claim 1, wherein the inverse transform module applies an N-point, complex fast Fourier transform (FFT) to the zero-padded downstream coefficients, and the upstream coefficients are generated with an N-point, complex FFT, N an integers greater than 1.

6. The invention as recited in claim 1, wherein the transmit path further includes a filter reducing or eliminating signal components at frequencies generated from block boundary effects.

7. The invention as recited in claim 1, wherein the transmit path further includes a copy and add module that processes the downstream digital samples to provide a periodic signal.

8. The invention as recited in claim 1, wherein the circuit is embodied in an integrated circuit.

9. The invention as recited in claim 1, wherein the circuit is implemented a modem including a digital multi-tone transceiver coupled to the transmit and receive paths.

10. In a signal processing application, a method of providing transmission rate compensation for a circuit having a receive path configured i) to receive a block of downstream digital samples in a time domain at a first data rate and ii) to generate downstream coefficients in a frequency domain, the method comprising the steps of:
(a) receiving upstream coefficients representing a signal in the frequency domain at a second data rate in a transmit path, wherein the first data rate is greater than the second data rate, wherein step (a) further comprises the steps of:
  (a1) applying an intermediate inverse transform to the received downstream coefficients to generate intermediate digital samples;
  (a2) interpolating the intermediate digital samples; and
  (a3) applying an intermediate transform to the intermediate digital samples to generate the upstream coefficients;
(b) appending one or more zeros to each set of upstream coefficients in the transmit path; and
(c) applying an inverse transform to convert each set of zero-padded upstream coefficients into a corresponding block of upstream digital samples representing the signal and at a compensated transmission rate in proportion to the first data rate.

11. The invention as recited in claim 10, wherein, for step (a), the transmit and receive paths are coupled between a digital multi-tone (DMT) transceiver and a codec, and step (c) further comprises the step of providing the block of upstream digital samples to the codec.

12. The invention as recited in claim 10, wherein step (c) comprises the step (c1) of interpolating a sequence of samples generated by applying the inverse transform to each set of zero-padded upstream coefficients to generate the downstream digital samples at the second data rate.

13. The invention as recited in claim 10, wherein the transmit path further includes a filter reducing or eliminating signal components at frequencies generated from block boundary effects.

14. The invention as recited in claim 10, wherein step (c) applies an N-point, complex fast Fourier transform (FFT) to the zero-padded downstream coefficients, and the upstream coefficients are generated with an N-point, complex FFT, N an integers greater than 1.

15. The invention as recited in claim 10, further comprising the step of filtering the signal represented by the downstream digital samples to reducing or eliminating signal components at frequencies generated from block boundary effects.

16. The invention as recited in claim 10, further comprising the step of processing the downstream digital samples to provide a periodic signal.

17. The invention as recited in claim 10, wherein the method is implemented by at least one processor embodied in an integrated circuit.

18. The invention as recited in claim 10, wherein the method is implemented in a processor of a modem including a digital multi-tone transceiver as the transceiver.

19. A computer-readable medium having stored thereon a plurality of instructions, the plurality of instructions including instructions which, when executed by a processor, cause the processor to implement a method for providing transmission rate compensation for a circuit having a receive path configured i) to receive a block of downstream digital samples in a time domain at a first data rate and ii) to generate downstream coefficients in a frequency domain, the method comprising the steps of:
(a) receiving upstream coefficients representing a signal in the frequency domain at a second data rate in a transmit path, wherein the first data rate is greater than the second data rate, wherein step (a) further comprises the steps of:
  (a1) applying an intermediate inverse transform to the received downstream coefficients to generate intermediate digital samples;
  (a2) interpolating the intermediate digital samples; and
  (a3) applying an intermediate transform to the intermediate digital samples to generate the upstream coefficients;
(b) appending one or more zeros to each set of upstream coefficients in the transmit path; and
(c) applying an inverse transform to convert each set of zero-padded upstream coefficients into a corresponding block of upstream digital samples representing the signal and at a compensated transmission rate in proportion to the first data rate.

* * * * *